(12) United States Patent
Balasubramanian et al.

(10) Patent No.: US 7,339,948 B2
(45) Date of Patent: Mar. 4, 2008

(54) INDUSTRIAL CONTROLLER PROVIDING DETERMINISTIC COMMUNICATION ON ETHERNET

(75) Inventors: Sivaram Balasubramanian, Solon, OH (US); Kendal R. Harris, Mentor, OH (US); Anatoly Moldovansky, Pepper Pike, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1049 days.

(21) Appl. No.: 10/349,532

(22) Filed: Jan. 22, 2003

(65) Prior Publication Data

US 2004/0141517 A1     Jul. 22, 2004

(51) Int. Cl.
*H04L 12/43* (2006.01)
(52) U.S. Cl. .................... 370/458; 370/516
(58) Field of Classification Search ........... 370/431, 370/462, 458, 516, 443, 354
See application file for complete search history.

(56) References Cited

U.S. PATENT DOCUMENTS

| | | | | |
|---|---|---|---|---|
| 4,177,450 A | * | 12/1979 | Sarrand | 370/431 |
| 5,434,861 A | * | 7/1995 | Pritty et al. | 370/449 |
| 5,491,531 A | * | 2/1996 | Adams et al. | 375/354 |
| 5,553,072 A | * | 9/1996 | Daggett et al. | 370/447 |
| 5,774,658 A | | 6/1998 | Kalkunte et al. | |
| 5,941,952 A | * | 8/1999 | Thomas et al. | 709/234 |
| 6,026,095 A | | 2/2000 | Sherer et al. | |
| 6,310,886 B1 | * | 10/2001 | Barton | 370/462 |
| 6,330,231 B1 | * | 12/2001 | Bi | 370/328 |
| 2002/0001299 A1 | * | 1/2002 | Petch et al. | 370/350 |
| 2002/0031144 A1 | * | 3/2002 | Barton | 370/468 |
| 2002/0167903 A1 | * | 11/2002 | Nakano et al. | 370/230 |
| 2003/0097484 A1 | * | 5/2003 | Bahl | 709/313 |

FOREIGN PATENT DOCUMENTS

DE     19721740 A     11/1998

* cited by examiner

*Primary Examiner*—Kwang Bin Yao
*Assistant Examiner*—Andrew Lai
(74) *Attorney, Agent, or Firm*—Keith M. Baxter; R. Scott Speroff

(57) ABSTRACT

A transmission schedule is overlaid on the Ethernet protocol to allow use of this readily available high speed protocol for transmission of I/O data communicated in an industrial control environment and requiring a high degree of determinism. Scheduling improves load leveling and bandwidth utilization and by producing a more consistent delay may be teamed with time synchronization to produce more accurate clock synchronization.

29 Claims, 3 Drawing Sheets

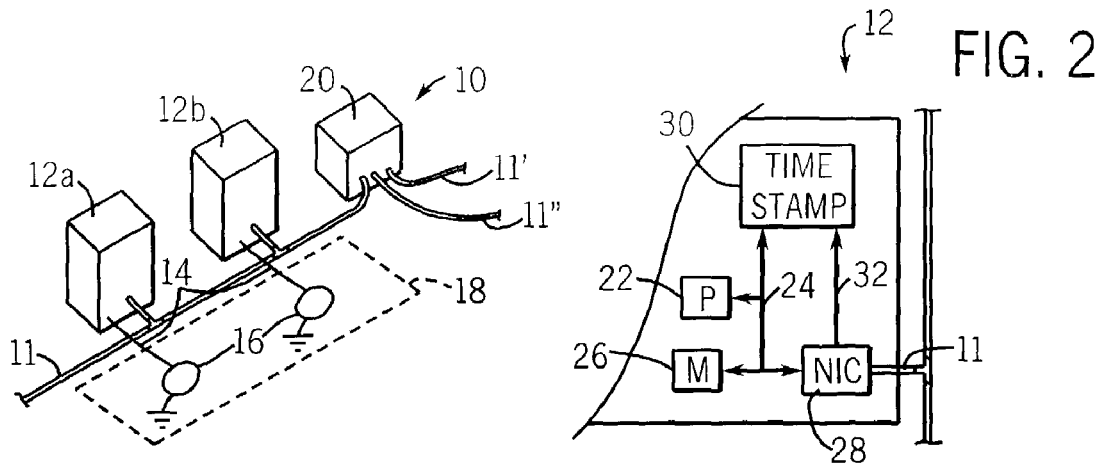
FIG. 1
FIG. 2
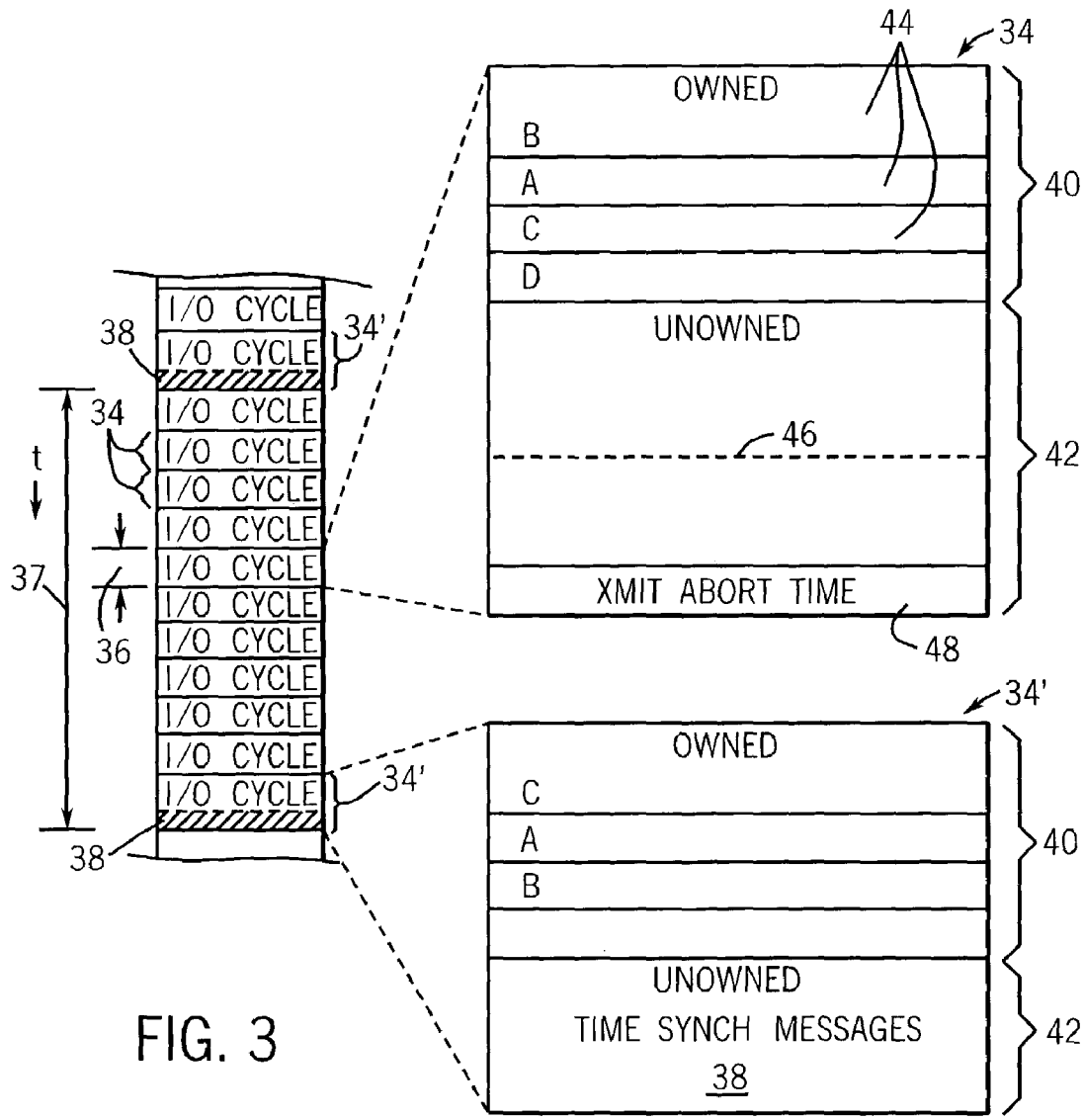
FIG. 3

INDUSTRIAL CONTROLLER PROVIDING DETERMINISTIC COMMUNICATION ON ETHERNET

CROSS-REFERENCE TO RELATED APPLICATIONS

- - -

STATEMENT REGARDING FEDERALLY SPONSORED RESEARCH OR DEVELOPMENT

- - -

BACKGROUND OF THE INVENTION

The present invention relates generally to industrial controllers for the control of machines and processes, and in particular, to an industrial controller whose components communicate input and output signals over an Ethernet network.

Industrial controllers are special purpose computers and circuitry for the control of processes and machinery in a factory or the like. Generally, an industrial controller reads input signals from sensors associated with the controlled process and executes one or more stored control programs to provide output signals to actuators associated with the controlled process. The outputs are determined according to the logic of the stored control programs and the values of inputs received from the sensors.

The process being controlled may be spread over a large area, and the components of the industrial controller distributed so that each component is close to the portions of the process to which it relates. These separated components may communicate input and output signals (I/O) with each other as nodes on a high-speed network.

The network used for communication of I/O for industrial control should be "deterministic" meaning, generally, that it should provide tightly bounded communication delay in transmitting signals and predictable variations in delay, such as is termed "jitter". Determinism helps ensure that the industrial controller will work in a repeatable manner when the controlled process is in the same state and providing the same inputs to the industrial controller at different times.

A number of commercially available networks can provide deterministic communication for industrial control; however, they are relatively expensive and have limited acceptance outside the area of industrial control. Ethernet, on the other hand, is a widely used network that provides high-speed performance with relatively low costs in hardware. Further, Ethernet supports Internet protocols and thus provides a simple method of interconnecting to remote points of using the Internet.

An industrial controller using an Ethernet network would have greater flexibility in communication, could avail itself of readily available and inexpensive network components, and could make use of existing network infrastructures.

Unfortunately, Ethernet is inherently non-deterministic because of its method of arbitrating between competing nodes that wish to transmit on the shared network medium. Each node can only transmit when no other node is transmitting, so if one node wishes to transmit while the medium is being used by another node, there will be an arbitrary delay in the transmission of that node's message as the node waits for the medium to become free. If two nodes transmit at the same time, both nodes will sense a collision and hold off retransmitting for a random time also introducing variable delay. The hold off time is not constant but increases with the number of successive collisions experienced by the nodes. Interference between nodes starts degrading network performance when the network is loaded with as little as 25% of its total capacity.

If separate Ethernet media are joined using a switch, additional sources of variable message delay are introduced as switches buffer or store messages intended for a single node that would otherwise result in a collision. The buffering introduces a delay that will substantially depend on network load.

Synchronized clocks at each node on the network can be used to overcome some problems of coordinating control actions between separated components of the industrial controller. For example, I/O messages may be time stamped to be re-ordered at their destination and output messages may be time stamped for a time of execution and thereby be somewhat indifferent to network delay. Co-pending U.S. patent application filed on even date herewith and entitled Fast Frequency Adjustment Method for Synchronization Network clocks, hereby incorporated by reference, describes a method of synchronizing clocks over a network that presents a relatively constant and predictable message delay. Nevertheless, large variation in network delay associated with non-deterministic networks such as Ethernet networks, can prevent accurate clock synchronization at the different network nodes.

BRIEF SUMMARY OF THE INVENTION

The present invention provides improved determinacy in Ethernet networks by overlaying a distributed schedule, enforced by the nodes, over the Ethernet protocol. The Ethernet protocol and hardware does not change, but network collisions are reduced, network delay and jitter controlled, and as a side benefit, network capacity increased.

Principally, the schedule provides each node with exclusive ownership of a fixed portion of the network bandwidth eliminating collisions and thus variations in network delay. The schedule also provides for "unowned" time that can be used by any node, particularly nodes not yet scheduled which nevertheless need to communicate to join the schedule. The schedule further provides for periods specific to the specialized messages used for synchronizing local clocks on the nodes, such as are particularly susceptible to jitter. The schedule may also enforce a quiet time that prevents traffic during the unowned portion of the schedule from interfering with the traffic during the owned portion of the schedule or during the time synchronization period. This quiet time also accommodates network switches by creating a time during which buffered messages in the switches are drawn down prior to owned portions of the schedule and critical time synchronization periods.

Specifically then, the present invention provides a method of deterministic transmission of I/O data between nodes of an industrial controller using an Ethernet network. The method includes the step of communicating information between the nodes to establish a common schedule defining an owned transmission time exclusive to each node. The schedule is such that total expected transmissions by the nodes during the scheduled transmission times consumes less than the network bandwidth. Each node is then operated to transmit during their scheduled transmission times.

It is one object of the invention to use standard Ethernet hardware and software to provide highly deterministic communication of input and output data for an industrial controller. The scheduling is implemented by the nodes outside of the Ethernet protocol thus eliminating any need to modify standard Ethernet hardware, firmware, or software.

The common schedule may define an unowned transmission time that may be used by any node.

Thus, it is another object of the invention to allow the Ethernet network to be used to initialize and reconfigure the schedule such as may require communications outside of the owned times.

The unowned transmission time may be of a predetermined duration.

Thus, it is another object of the invention to prevent unowned transmissions from creating non-determinism in the communication on the network as can occur with standard Ethernet.

The unowned transmission time may conclude with a transmission abort time upon which any pending transmission must be aborted or with a no new transmission time upon which any pending transmission may be completed but no new transmissions may be initiated.

Thus, it is another object of the invention to prevent unowned transmissions from interfering with subsequent owned transmissions. The choice between these methods of establishing a quiet time provides flexibility in whether unowned transmissions should be truncated or preserved at the cost of allocating additional bandwidth to the quiet time.

The information communicated between the nodes may include transmission requirements of each node selected from the group consisting of packet frequency and allowable packet jitter.

Thus, it is another object of the invention to provide a method for scheduling that uses as its input the critical features of determinism required of I/O data.

Each node may recreate the schedule from the information communicated between the nodes and the schedule coordinator.

Thus, it is another object of the invention to decrease the amount of data that needs to communicated by eliminating the communication of the schedule directly, and only communicating the compact data set needed to rebuild the schedule.

Each node may create the schedule by dividing transmission time into I/O cycles holding multiple Ethernet data packets. The node with the lowest packet frequency then defines a schedule length of I/O cycles. The scheduling process schedules yet unscheduled nodes with the highest packet frequency in each of the I/O cycles of the schedule length necessary to meet its schedule frequency preferring least filled I/O cycles. This process is repeated in order of packet frequency until all nodes are scheduled.

Thus, it is another object of the invention to provide a simple scheduling algorithm that naturally produces load leveling between I/O cycles.

The step of scheduling may also review jitter requirements of the node communications and select scheduling only that meets node jitter requirements.

Thus, it is another object of the invention to provide a simple algorithm that provides jitter control.

The method may include the step of periodically transmitting from a schedule coordinator to the other nodes a "keep-alive" signal and deleting a node from the schedule if it does not reply to the keep-alive signal. The method may further include the step of transmitting from the schedule coordinator to the other nodes a recreate schedule message causing recreation of the schedule at each node from new information provided by the schedule coordinator.

Thus, it is another object of the invention to allow dynamic updating of the schedule as nodes are added or lost or when the schedule becomes inefficiently fragmented.

The schedule may be organized into I/O cycles during which multiple nodes have owned transmission time and wherein the schedule further provides for periodic transmission of time synchronization signals between a time master node and other nodes.

Thus, it is another object of the invention to provide the benefits of determinism to the process of time synchronization thus improving the ability to synchronize clocks among the nodes.

The period before transmission of time synchronization signals may be scheduled for no transmissions by the nodes.

Thus, it is another object of the invention to provide for a period of time during which buffers in switches may be depleted so as not to interfere with the time synchronization signals such as require a fixed network delay.

These particular objects and advantages may apply to only some embodiments falling within the claims and thus do not define the scope of the invention.

BRIEF DESCRIPTION OF THE DRAWINGS

FIG. 1 is a perspective view of a simple industrial control system having two nodes, one of which may serve as a schedule coordinator, and a switch communicating with other networks;

FIG. 2 is a block diagram showing the circuitry of the nodes of FIG. 1 including a processor for executing a stored program in memory to implement the scheduling of the present invention;

FIG. 3 is a diagram showing division of the network bandwidth into I/O cycles and showing the further partitioning of the I/O cycles into owned and unowned portions and showing scheduled time synchronization periods;

DETAILED DESCRIPTION OF THE PREFERRED EMBODIMENT

Figure 4:
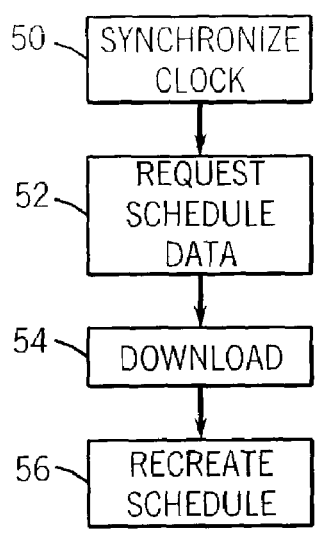
FIG. 4 is a flow chart showing the steps of adding a node to the network of FIG. 1 so that it is incorporated into a schedule governing all nodes.

Referring now to FIG. 1, an industrial controller 10 may include a first node 12*a* to a second node 12*b* communication on an Ethernet network 11. Each node 12 may provide one or more I/O lines 14 communicating with sensors or actuators 16 in turn communicating with the industrial process 18 for the control thereof according to methods well known in the art.

The communications network 11 may connect through a switch 20 with other communications networks 11' and 11" which may in turn have other nodes 12 (not shown).

Referring to FIG. 2, each of the nodes 12 may include a processor 22 communicating by an internal bus 24 with a memory 26 holding one or more stored programs executed by the processor 22. The stored programs may include portions of a control program and the program implementing the present invention.

The processor 22 may further communicate over the bus 24 with an Ethernet card 28 connected to the network 11 and with time stamping circuitry 30. The time stamping circuitry 30 allows for time stamping of messages receiving and transmitted by the Ethernet card 28 flagged by interrupt signal over line 32. The operation of such time stamping is described in the above referenced co-pending application.

Referring now to FIG. 3, the total information carrying capacity of the network 11, i.e., its bandwidth, may be divided into a set of segments in time designated as I/O cycles 34. Typically in an industrial controller, each I/O cycle is sufficiently long so as to allow every input or output point on the industrial controller to update its value. In one method of industrial control, the updating of the I/O is done before any logical processing so as to prevent race conditions and to provide for more deterministic outcomes in the controlled process. For a typical industrial controller, the I/O cycle may be, for example, 250 microseconds representing an I/O cycle time 36.

Periodically, part of the I/O cycle 34' may be used for communication of a time synchronization message 38 used to synchronize clocks operating in the different nodes 12. The time synchronization messages 38, for example, may be transmitted once per second representing a synchronization cycle time 37.

In the present invention, each I/O cycle 34 is scheduled, as are the synchronization methods. Further, each I/O cycle 34 is divided into an owned portion 40 and an unowned portion 42. Generally, as will be described in greater detail below, the owned portion 40 embraces a number of frames 44 which are assigned by the schedule to one specific node (e.g., 12a or 12b). That node 12 is termed the owner of that frame 44 as indicated by letters A, B, C, and D representing different owner nodes 12. No more than one node 12 may own a frame 44 and only the owner of a frame 44 may transmit during that frame 44. The total time of owned frames 44 cannot exceed the owned portion 40.

Following the owned portion 40 is an unowned portion 42 in which any node 12 may transmit subject to the normal network contention mechanisms of Ethernet. The unowned portion 42 may include all of the time of the I/O cycle 34 not used by the owned portion 40 but in the first embodiment is never less than a guaranteed unowned portion 46.

Concluding each I/O cycle 34 is a transmit abort period 48 during which any transmitting node must abort messages that are not complete. It will be understood that in this way messages from the unowned portion 42 cannot continue their transmission into the subsequent owned portion 40 of the next I/O cycle 34.

As mentioned above, selected I/O cycles 34' include a period during which time synchronization messages 38 are scheduled for transmission. The time synchronization messages 38 are the only messages in the unowned portion 42 of its I/O cycle 34'. Eliminating other data transmitted during the unowned portion 42 reduces the possibility that such transmissions will continue into the time allotted for the time synchronization message 38.

It will be understood that the scheduling described above, by eliminating collisions, essentially eliminates any delay caused by waiting for other competing transmissions inherent in the Ethernet protocol. In this regard, the scheduling allows greater utilization of the bandwidth of the Ethernet network 11 without the inefficiencies inherent in concurrent resolution of contention, such as in practice, cause a plateau in utilization efficiency of Ethernet well below fifty percent.

Further, it will be understood that the use of the scheduling implemented by the nodes 12 does not require any change to the Ethernet protocol. The Ethernet protocol still includes its standard procedures for detecting collisions and resolving those collisions but the higher level scheduling eliminates any invocation of those procedures.

The present invention also contemplates a dynamic method of implementing and updating the schedule and disseminating the schedules to the various nodes in coordinated fashion. Initially, the schedule is empty and filled as nodes are added to the network 11. Referring now to FIG. 4, in a first step, as indicated by process block 50, a new node, e.g., 12a coordinates itself to the general periodicity of the I/O cycles 34 by monitoring the network 11 and identifying a unique message, for example, the transmit abort time message concluding each I/O cycle 34, so as to synchronize itself roughly with the transmission of the I/O cycles 34. The new node 12a then identifies the time sync messages 38 in I/O cycles 34' to coordinate with the synchronization cycle time 37 and by communicating with the master clock during I/O cycles 34', synchronizes its clock roughly to the master clock.

Referring to FIG. 1, at the time of initialization of the network 11, one node 12b may be designated as a schedule coordinator although it will be understood that the schedule coordinator may in fact be a shared duty or otherwise virtual and spread among the nodes. A master clock node is also chosen to provide a time to which other clocks are synchronized. The master clock is preferably a node with the most accurate clock or a link to an independent time source. In the present embodiment, it will be assumed that the schedule coordinator and the master clock are the same node 12b, however, this is not required.

At the conclusion of process block 50 of FIG. 4, the new node 12a is synchronized sufficiently with the network that it may observe proper scheduling but node 12a does not yet have a schedule. Accordingly, as indicated by process block 52, the new node 12a next identifies the schedule coordinator 12b using messages transmitted in the unowned portion 42 and requests schedule data.

The schedule coordinator 12a responds to this request not by downloading a schedule but instead by downloading a list of the nodes 12 and their bandwidth requirements as indicated by process block 54. From this information, as indicated by process block 56, the new node 12a recreates the schedule using a computer algorithm common to each of the nodes 12.

Figure 5:
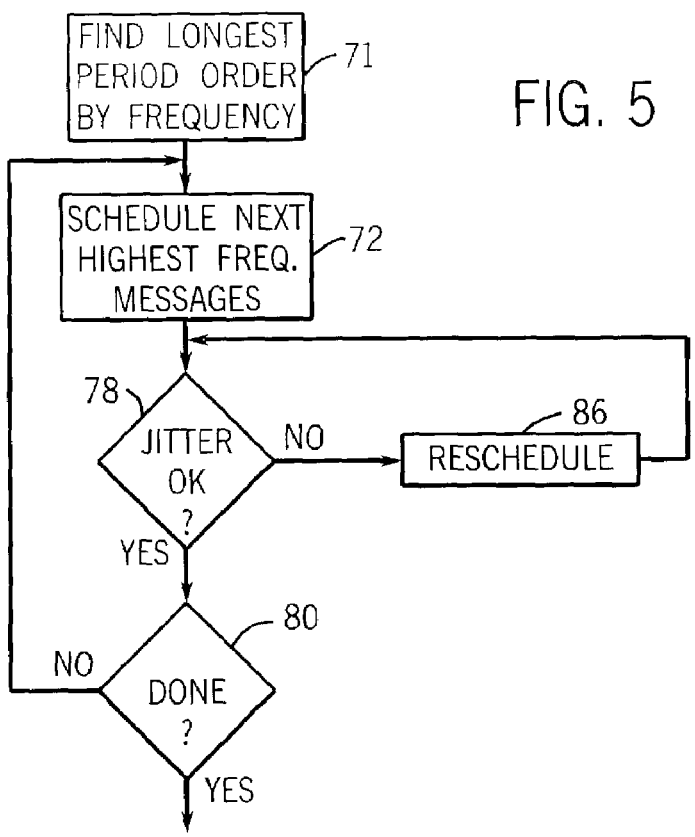
FIG. 5 is a flowchart showing the process of computation of the schedule at each of the nodes from data related to packet frequency and jitter.
Figure 6:
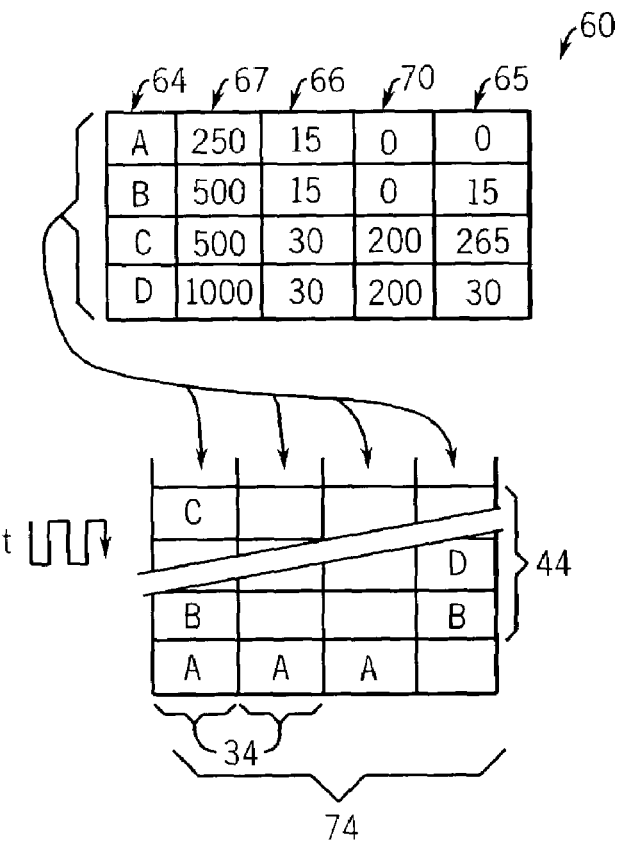
FIG. 6 is a diagram depicting the scheduling process of FIG. 5.

Referring now to FIGS. 5 and 6, the information downloaded to the node 12a from the schedule coordinator 12b comprises a data structure 60 including node identifiers 64, packet transmission start time 65, packet length 66, packet frequency 67, and jitter limits 70. In FIG. 5, node identifiers that serve to uniquely identify each node 12a, 12b etc., for simplicity, are indicated as the letters A, B, C, and D. The packet frequency 67, indicating how often the node 12 needs to transmit information may be provided as a number of microseconds. Thus, in the example, node A has a requirement of transmitting a packet every 250 microseconds, nodes B and C have requirements of transmitting a packet every 500 microseconds, and node D has the requirement of transmitting a packet every 1,000 microseconds. The packet transmission start time 65, expressed in microseconds, indicates absolute time within schedule length of I/O cycles when a packet of this node identifier 64 will be first transmitted. Thus, in this example node A will be transmitted first at time 0, node B will be transmitted first at time 15 and node C will be transmitted first at time 265. This information is yet to be determined through scheduling for node D. The packet length 66, expressed in microseconds, indicates the transmission time that needs to be reserved for a packet. In this example, nodes A and B have a packet length of 15 and nodes C and D have a packet length of 30. The maximum allowable jitter 70, also expressed in microseconds, is also provided for each node 12. Jitter, as used herein, indicates change in the relative timing of the message within the I/O cycle, between I/O cycles 34. In this example, nodes A and B require zero jitter and nodes C and D require 200 microseconds of jitter or less.

The new node 12d, for example, receives the above information for each of the other nodes A, B, and C from the schedule coordinator 12b and in turn transmits to the schedule coordinator the same information for itself. In this way, the schedule coordinator has a complete set of data for all nodes 12 that it can provide to the next new node 12e.

The information received by the new node 12d allows the node 12 to generate the existing schedule, which it does before scheduling itself. The method of generating the schedule ensures that the schedule will be identical to the schedules generated by other nodes 12 and the scheduling coordinator using this same data.

Referring to FIG. 5, a first step of this method of generating the schedule, shown by process block 71, reviews the data structure 60 to find the node with the longest period of transmission 67. In this case, that will be node D having a 1,000 microsecond period of transmission 67. The nodes 12 are then arranged in order of highest frequency 66 first which in this case provides for an ordering of node A, B, C, then D.

At succeeding process block 72, a schedule unit 74 is established of a number of I/O cycles 34 equal in length to the longest period (e.g. 1,000 microseconds) established at process block 71. In this case, four 250 microsecond I/O cycles 34 comprise the schedule unit 74. The starting I/O cycle 34 of the schedule unit 74 is arbitrarily fixed when the first node is scheduled. The top most node 12 in the ordering, in this case node A, is then scheduled by placing it at the end of successive I/O cycles 34 starting with the first I/O cycle within the schedule unit 74 so that the frequency 67 is satisfied as an average over the period of the schedule unit 74.

In this example, this process provides for a scheduling of transmissions by node A at all the I/O cycles 34 of the schedule unit 74.

At decision block 78, the schedule is analyzed to see if it provides for the necessary jitter requirement for node A. In this case, since each of the blocks indicated by the letter A are scheduled in the same relative location within each I/O cycle 34, the jitter is zero and thus, the jitter requirement is satisfied. If jitter is not satisfied, node A is rescheduled to place its packets at the same relative locations within each I/O cycle 34 as indicated by process block 86.

Presumably scheduling with appropriate jitter limits can be obtained for the initial nodes as a preexisting schedule is simply being reconstructed.

If the scheduling is not complete as determined at process block 80, meaning that all the nodes except for the current node 12a have been entered into the schedule unit 74, this process of process block 72 is repeated for the next highest frequency node, in this case node B. After the first node A has been placed, the scheduling prefers I/O cycles 34 that are least filled and the node B is scheduled between times 15 and 30, thereafter repeating once every 500 microseconds with 0 jitter. Similarly node C is scheduled between times 265 and 295, thereafter repeating once every 500 microseconds with 0 jitter.

The above process is then repeated for node D resulting in scheduling of messages for node D at time between 30 and 60, thereafter repeating once every 1000 microseconds with 0 jitter.

This simple process provides for a scheduling that evens the load between I/O cycles 34 and provides for accommodation of jitter limits in the particular messages and is continued until the list of data structure 60 is exhausted.

It is possible that the new node 12d cannot schedule itself. Error conditions are produced if the schedule cannot work with in the bandwidth limits of the network being defined as the owned portion of each I/O cycle 34. If the problem is meeting the new nodes jitter requirements, the schedule coordinator may issue instructions to all nodes to reschedule incorporating the requirements of the new node 12a into the initial sorting rather than at the end of scheduling the other nodes. Data from nodes that have left the network 11 may be eliminated at this time as well so as to defragment the schedule improving the possibility that a schedule can be produced. If a schedule cannot be produced, and error condition is generated.

The schedule coordinator may periodically transmit this reschedule command to defragment the schedules regardless of the entry of a new node. Further, the nodes may be required to periodically transmit a keep-alive signal to the schedule coordinator so that the schedule coordinator can identify dead nodes and remove them from the schedule at the time of the next rescheduling command.

Referring again to FIG. 1, in this manner, new node 12a receives a schedule and controls its transmissions to comport with the owned portion 40 of that schedule. Once on the schedule, node 12a may further refine its synchronization communicating during the time synchronization portions and monitoring network delay so as to closely bring its clock into closer conformance with that of the master clock 12b. The scheduling improves the consistency of the network delay allowing for much better time synchronization.

Figure 8:
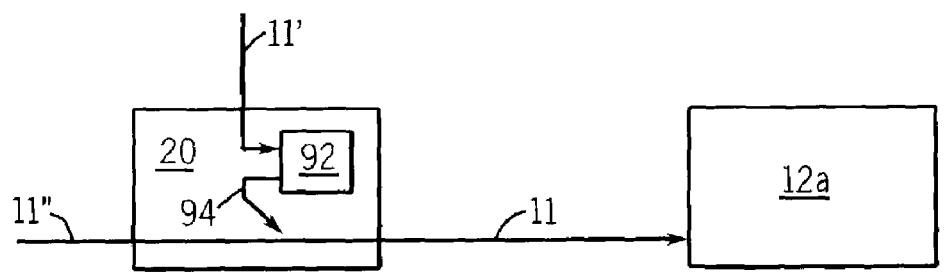
FIG. 8 is a diagram showing the operation of a switch in averting a potential collision but such as introduces variable delay in the communications between nodes.

Referring again to FIG. 1, the above-described embodiment of the invention works well for shared media Ethernet networks and Ethernet networks with repeaters/hubs. When a switch 20 is introduced into the network communication, however, additional steps must be taken. Referring now to FIG. 8, the switch 20 may provide for a joining of, for example, three distinct Ethernet network links 11, 11' and 11". Generally, the switch 20 is not programmed to observe the schedule shared by the nodes 12, and thus cannot observe the transmit abort period 48. Further, switch 20 may include a buffer 92 providing desirable features of buffering messages that would otherwise collide but creating the undesirable possibility of buffered messages from the unowned portion 42 being time shifted into the owned portion 40. For example, messages on network links 11' and 11" transmitted during the unowned period and both intended for node 12a on network link 11 might be transmitted at the same time resulting from the lack of contention on individual network links 11' and 11". The switch 20 will then buffer the message on 11' allowing the message on 11" to proceed directly to node 12a. At a later time, the message in buffer 92 is transmitted to node 12a as indicated by arrow 94. The messages received by the buffer 92 may be first in first out (FIFO), or in a prioritized switch, may be sorted according to the packet priority. In either case, however, significant delays may be introduced and transmissions may occur in the times otherwise allocated for time synchronization or scheduled messages and messages may move from unowned portion 42 to interfere with the synchronization message 38 or messages during the owned portion 40.

Figure 7:
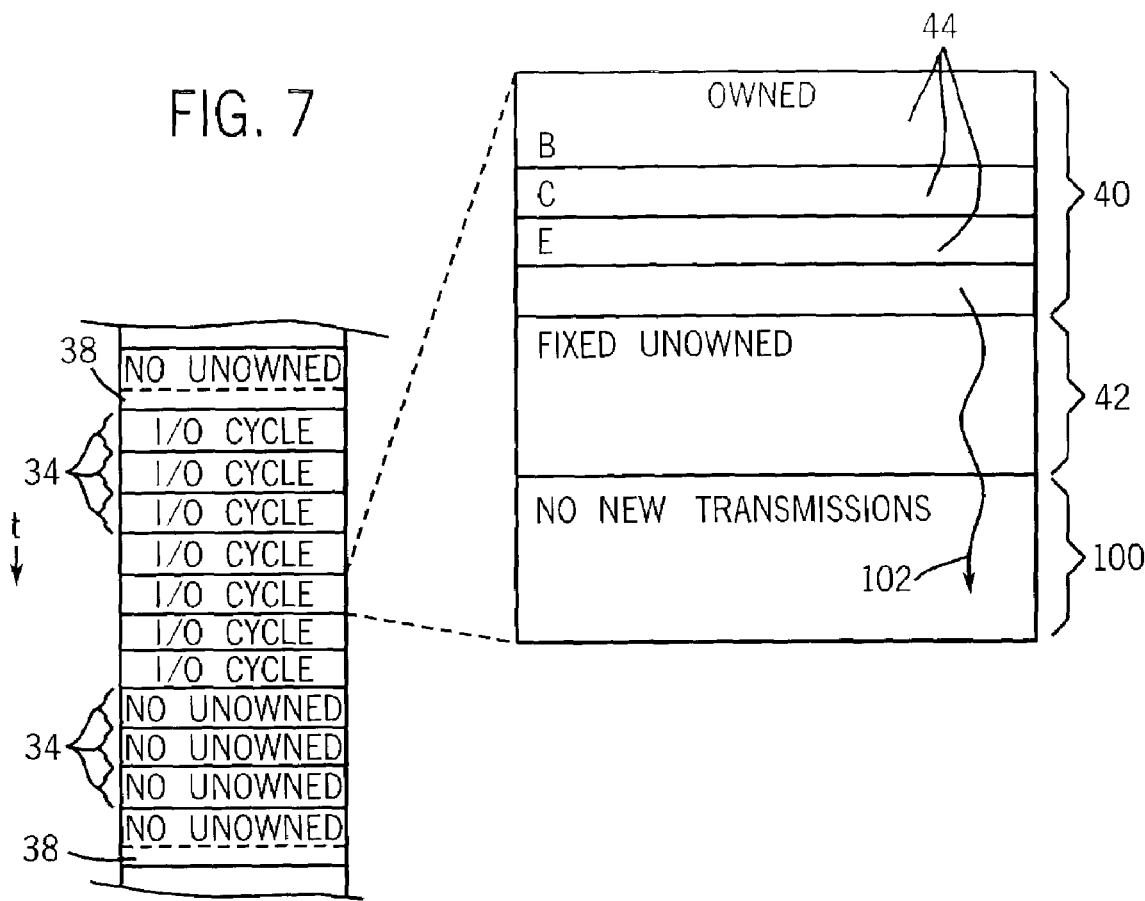
FIG. 7 is a figure similar to that of FIG. 3 showing minor modifications of the schedule for networks containing switches or buffers.

Accordingly, referring to FIG. 7, two changes may be implemented. The first is that I/O cycles 34 near the synchronization cycle time 37 may be designated as no-unowned-transmission I/O cycles 34". During these no-unowned-transmission I/O cycles 34" as suggested by the name, no unowned transmissions are allowed. New nodes entering the system can identify these I/O cycles 34' because they have synchronized themselves to the synchronization cycle time 37 and know that a predetermined number of previous I/O cycles 34 are no-unowned-transmission I/O cycles 34". These no-unowned-transmission I/O cycles 34", in which only scheduled messages may be sent, ensure that the buffer 92 of the switches are not filled and thus that buffers are empty during the time scheduled for the time synchronization message 38. Note that the switch 20 does not prevent schedules from crossing among different network links 11, 11', and 11".

Referring still to FIG. 7, in a second modification, the unowned portion 42 is fixed in length, thus limiting the uncertainty in the amount of unowned traffic and a no-new-transmission period 100 is established in each I/O cycle during which no new transmissions may occur from any of the nodes 12. This no-new-transmission period 100 contrasts to the transmit abort period 48 and reflects the fact that the switch 20 does not abide by the transmit abort. A sufficient guard space composed of unowned portion 42 and no-new-transmission period 100 is created so that switch buffered owned messages indicated by arrow 102 have been exhausted prior to the occurrence of the next owned portion 40 of the I/O cycle 34 or prior to the communication of a time synchronization message 38.

In yet a further embodiment, the problem of switch buffer data from unowned portion 42 is further managed by passing a token in round robin fashion among the nodes 12 so that only one node at a time may use the unowned portion 42. In this way, an absolute limit of unowned data comporting with the time allotted to the unowned data may be enforced since one node has full understanding of the data it will be using during its holding of the token while no node has overview of the unowned data requirements of all nodes. In this way, a hard time limit may be enforced on unowned transmissions.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of providing deterministic transmission of I/O data between nodes of an industrial controller communicating on an Ethernet network having a network bandwidth, the method comprising the steps of:
   (a) communicating information between the nodes to establish a common schedule defining for each node an owned transmission time exclusive to each node, wherein total transmission time by the nodes during an I/O cycle is less than total I/O cycle time; and
   (b) operating each node to transmit during the nodes owned transmission times;
   wherein the common schedule is established by:
   (i) dividing transmission time for all nodes into I/O cycles holding multiple Ethernet data packets, each node having a packet frequency, and wherein each I/O cycle has an I/O cycle time that is defined by a cycle time of the industrial controller;
   (ii) determining the node with the lowest packet frequency to define a schedule length of I/O cycles;
   (iii) scheduling a yet unscheduled node with the highest packet frequency in each of the I/O cycles of the schedule length required to meet its schedule frequency preferring least filled I/O cycles; and
   (iv) repeating step (iii) until all nodes are scheduled.

2. The method recited in claim 1 wherein the common schedule also defines an unowned transmission time that may be used by any node.

3. The method recited in claim 2 wherein step (a) employs the unowned transmission times.

4. The method recited in claim 2 wherein the unowned transmission time is of predetermined duration.

5. The method recited in claim 2 wherein the unowned transmission time concludes with a transmission abort time at which any pending transmission must be aborted.

6. The method recited in claim 2 wherein the unowned transmission time concludes with a no new transmission time at which any pending transmission may be completed but no new transmissions may be initiated.

7. The method recited in claim 1 wherein the information communicated between the nodes is provided to a single schedule coordinator node which collects the information for dissemination to the other nodes.

8. The method recited in claim 1 wherein the information communicated between the nodes includes transmission requirements of each node selected from the group consisting of packet transmission start time, packet length, packet frequency and allowable packet jitter.

9. The method recited in claim 8 wherein each node recreates the schedule from information communicated between the nodes.

10. The method recited in claim 8 wherein step (iii) reviews jitter requirements of node communications and selects scheduling only that meets the nodes' jitter requirements.

11. The method recited in claim 7 including the further step of periodically transmitting from the schedule coordinator to the other nodes a keep alive signal, and deleting a node from the schedule if it does not reply to the keep alive signal.

12. The method recited in claim 7 including the further step of transmitting from the schedule coordinator to the other nodes a recreate schedule message causing a recreation of the schedule at each node from new information provided by the schedule coordinator.

13. The method recited in claim 1 wherein the schedule is organized into I/O cycles during which multiple nodes have owned transmission time and wherein the schedule further provides for periodic transmission of time synchronization signals between a time master node and other nodes.

14. The method recited in claim 13 wherein each I/O cycle also includes unowned time during which any node may transmit and wherein the periodic transmission of time synchronization signals occurs in the place of unowned time in the I/O cycle.

15. The method recited in claim 13 wherein the information communicated between the nodes is provided to a single schedule coordinator node which collects the information for dissemination to the other nodes and wherein the time master node is the schedule coordinator.

16. The method recited in claim 13 wherein a period of time prior to the transmission of time synchronization signals is scheduled for no unowned transmissions by the nodes.

17. The method recited in claim 1 including the step of communicating between nodes over the Ethernet network using Internet protocols.

18. A communications system providing deterministic message transmission for industrial control comprising:
 (a) an Ethernet network;
 (b) a set of nodes communicating on the network, the nodes executing a stored program to:
  (i) intercommunicate to establish a common schedule defining an owned transmission time exclusive to each node, wherein total transmission time by the nodes in an I/O cycle is less than total I/O cycle time; wherein the nodes execute the stored program to establish the schedule by:
   (1) dividing transmission time defining a number of into I/O cycles holding multiple Ethernet data packets, wherein each I/O cycle has an I/O cycle time that is defined by a cycle time of the industrial control;
   (2) determining the node with the lowest packet frequency to define a schedule length of I/O cycles;
   (3) scheduling a yet scheduled node with the highest packet frequency in each of the I/O cycles required to meet its schedule frequency preferring least filled I/O cycles; and
   (4) repeating step (4) until all nodes are scheduled; and
  (ii) operate to transmit during their scheduled transmission times.

19. The communication system recited in claim 18 wherein the common schedule also defines an unowned transmission time that may be used by any node.

20. The communication system recited in claim 19 wherein the unowned transmission time is of predetermined duration.

21. The communication system recited in claim 19 wherein the unowned transmission time concludes with a transmission abort time at which any pending transmission must be aborted.

22. The communication system recited in claim 19 wherein the unowned transmission time concludes with a no new transmission time at which any pending transmission may be completed but no new transmissions may be initiated.

23. The communication system recited in claim 18 wherein the information communicated between the nodes includes transmission requirements of each node selected from the group consisting of packet transmission start time, packet length, packet frequency and allowable packet jitter.

24. The communication system recited in claim 18 wherein the nodes intercommunicate through a designated schedule coordinator to establish the common schedule and wherein the schedule coordinator executes the stored program to further transmit to the other nodes a remake schedule message causing each node to recreate the schedule from information communicated between the nodes and the schedule coordinator.

25. The communication system recited in claim 18 wherein step (3) of scheduling reviews jitter requirements of node communications and selects scheduling only that meets the nodes' jitter requirements.

26. The communication system recited in claim 18 wherein the nodes intercommunicate through a designated schedule coordinator to establish the common schedule and wherein the schedule coordinator executes the stored program to further periodically transmit from the schedule coordinator to the other nodes a keep alive signal and to delete a node from the schedule if it does not reply to the keep alive signal.

27. The communication system recited in claim 18 wherein the schedule is organized into I/O cycles during which multiple nodes have owned transmission time and wherein the schedule further provides for periodic transmission of time synchronization signals between a time master node and other nodes.

28. The communication system recited in claim 27 wherein the periodic transmission of time synchronization signals occurs in the place of unowned time in the I/O cycle.

29. The communication system recited in claim 18 wherein a period of time prior to the transmission of time synchronization signals is scheduled for no unowned transmissions by the nodes.

* * * * *